Figure 1:
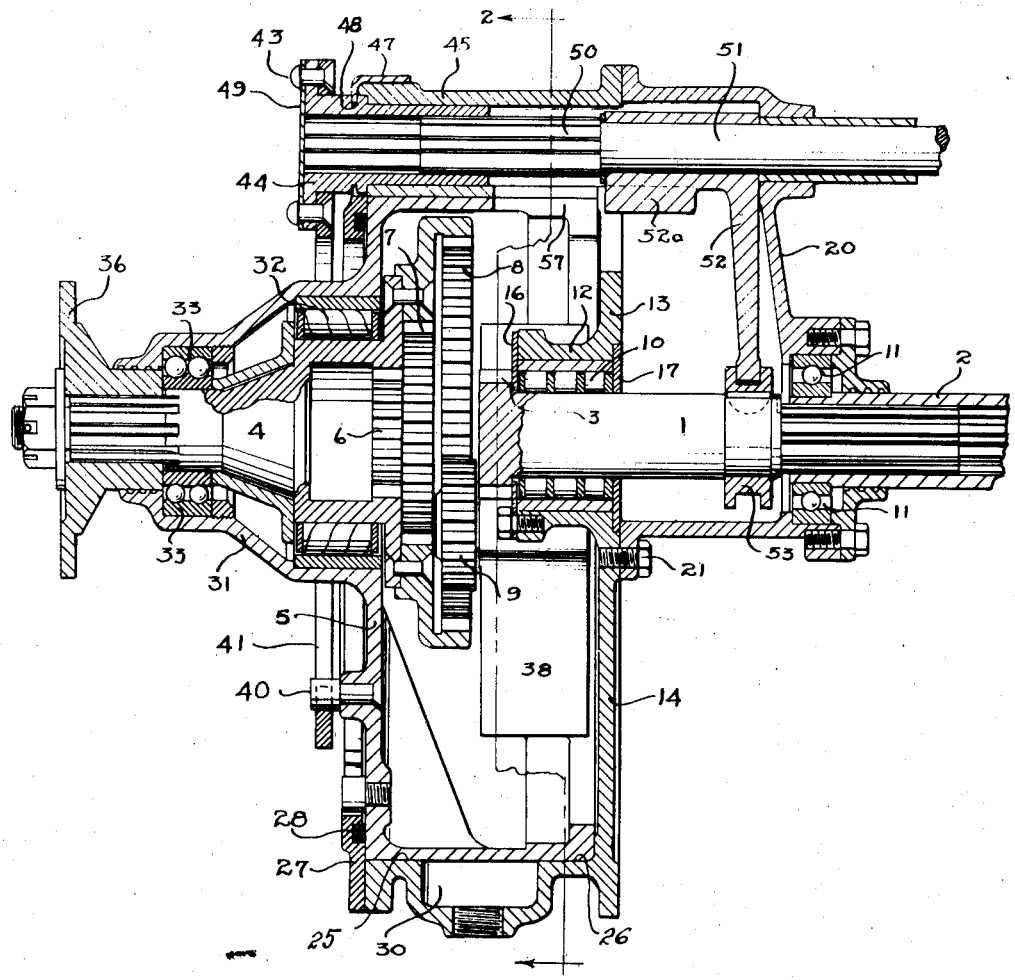

May 3, 1927.

C. E. F. AHLM 1,627,368

TRANSMISSION GEARING

Filed Aug. 16, 1924

3 Sheets-Sheet 1

May 3, 1927.

C. E. F. AHLM 1,627,368

TRANSMISSION GEARING

Filed Aug. 16, 1924    3 Sheets-Sheet 2

Inventor
Charles E. F. Ahlm
By Bates Macklin Goldrick & Teare
Attorney

May 3, 1927.

C. E. F. AHLM 1,627,368

TRANSMISSION GEARING

Filed Aug. 16, 1924

3 Sheets-Sheet 3

Patented May 3, 1927.

1,627,368

UNITED STATES PATENT OFFICE.

CHARLES E. F. AHLM, OF EAST CLEVELAND, OHIO, ASSIGNOR TO AUTOMOTIVE PATENT HOLDING COMPANY, OF CLEVELAND, OHIO, A CORPORATION OF DELAWARE.

TRANSMISSION GEARING.

Application filed August 16, 1924. Serial No. 732,386.

This invention relates to automobile transmission gearing and may be considered as an independently operable change speed transmission, or as one which is adapted to operate in conjunction with an already existing transmission to increase or to decrease the ratio between the driving member thereof and the rear axle.

The primary object of the invention is to provide a transmission that is adapted to operate efficiently when assembled into a compact unit, which shall occupy a minimum amount of space longitudinally of the car.

The invention, in common with other applications filed by me embodies the principle of causing a relative lateral movement between the axes of rotation of a pair of movable members to bring the members into driving relation one with the other. This is accomplished by a turning movement of an eccentric bearing member which is adapted to carry one of the movable members. A characteristic feature is the provision of a motion multiplying gearing mounted between the eccentric and an operating member for bringing the members into driving alignment. The result of this arrangement is that a slight angular movement of the operating member may be translated into a considerably greater angular movement of the eccentric. The operating member shown in this transmission subsequently serves to bring the movable members together into positive driving contact.

Another distinguishing characteristic of this invention between it and other constructions embodying a movable member having internal gears and a clutch adapted to be engaged by a driving pinion for changing the speed or direction of rotation of the said movable member, is that the lateral movement of one of the members necessary to bring the gears and pinion into alignment is imparted to the gear-carrying member while the necessary longitudinal movement which brings the gears and pinion into driving engagement is imparted to the pinion-carrying member.

Another feature is the provision of a compact gear shifting mechanism, which includes an eccentric bearing for a driving or a driven member, in which the mechanism which effects the transverse movement of one of these members is positioned in a unique manner to occupy a plane in common with the bearing for this member, resulting in a foreshortened and consequently more compact mechanism.

Other features and objects of my invention will become apparent in the further description of my invention which pertains to the accompanying drawings and the essential novel characteristics will be summarized in the claims.

Figure 2:
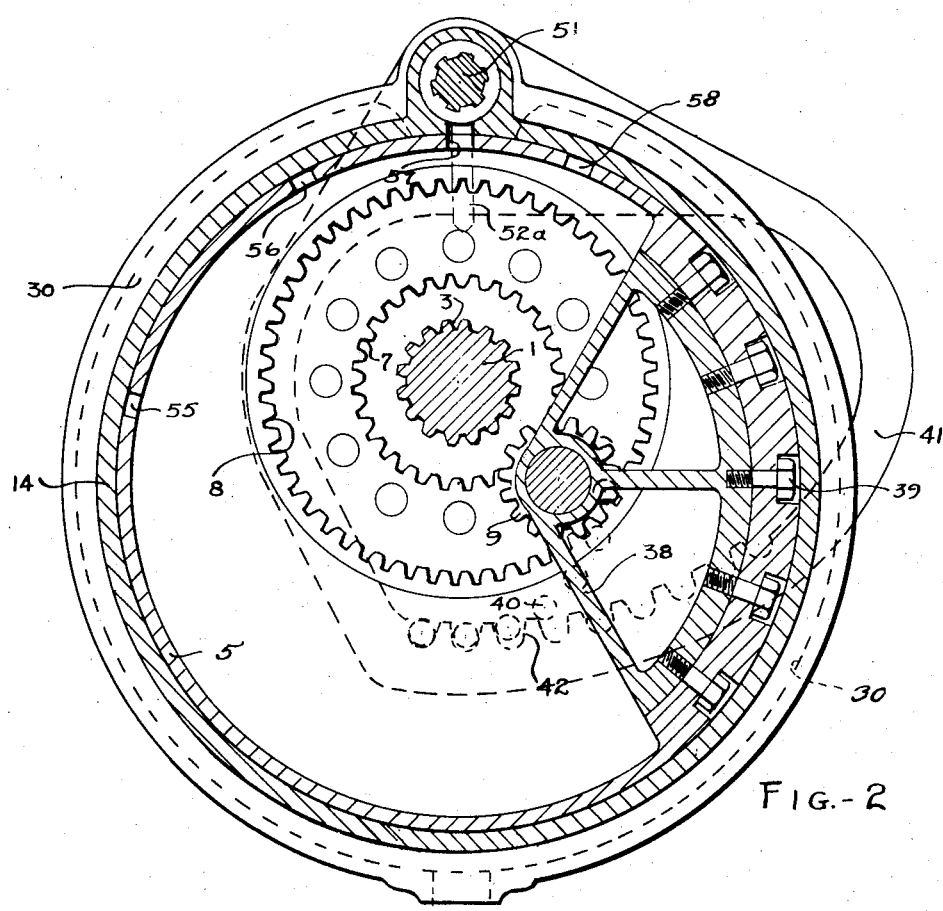
Figure 3:
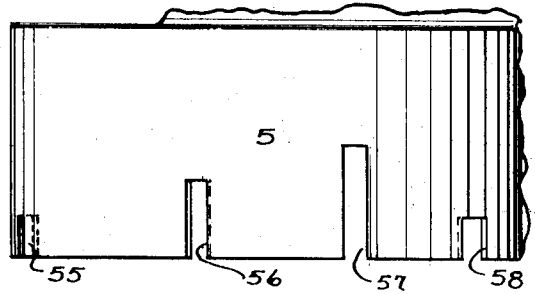
Figure 4:
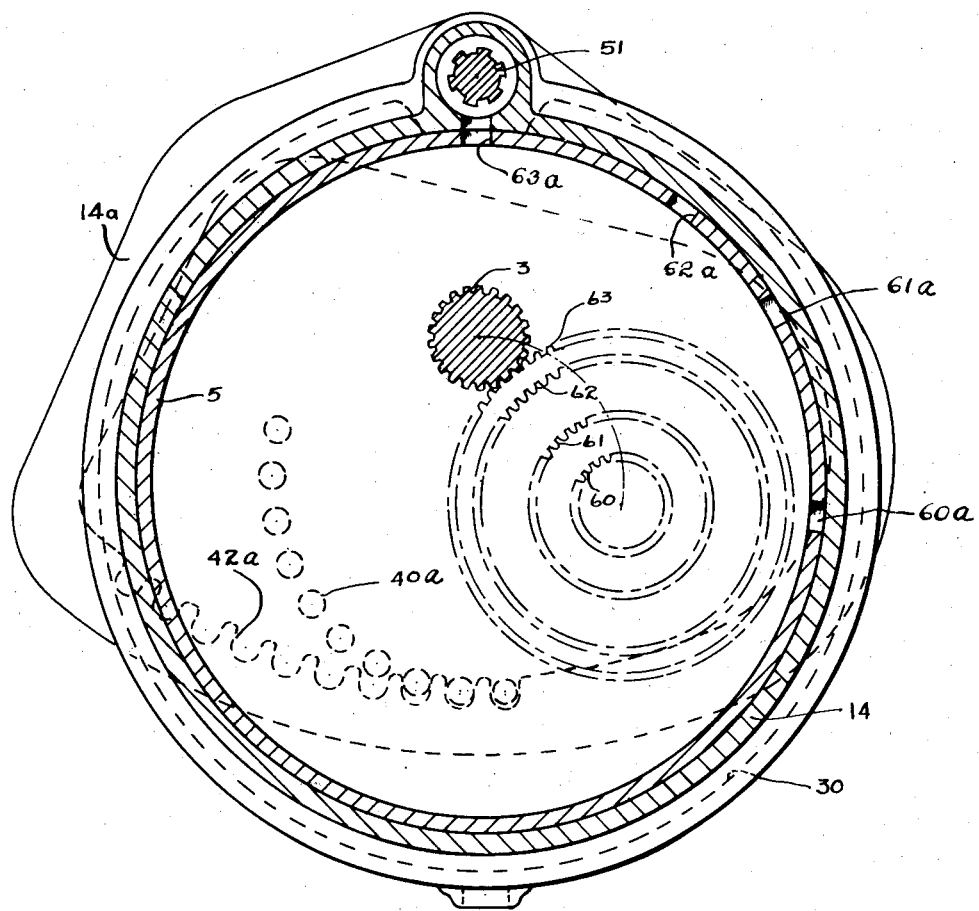

In the drawings, Fig. 1 is a substantially longitudinal cross-section through my transmission gearing; Fig. 2 is a transverse cross-section taken along the line 2—2 of Fig. 1; Fig. 3 is a plan view of a portion of an eccentric bearing member forming part of my invention. Fig. 4 is a cross-section on a reduced scale similar to Fig. 2, of a modified form of gearing.

Briefly my invention in its preferred form includes a pair of rotatable members, one adapted to drive the other. One of these members I have shown carried by a main housing and adapted to be moved longitudinally relative thereto. The other member is journaled in an eccentric bearing adapted to be rotated within the housing in such a manner that a number of internal gears and a reversing idler gear carried by the eccentric bearing may be brought into mesh with the pinion carried by the other rotatable member consequent upon a predetermined angular movement of the eccentric. The means for turning the eccentric which forms an important feature of my invention may consist of an annular arm provided with inwardly facing teeth. These teeth are adapted to cooperate with projections on the exterior of the eccentric bearing. The operating means for the arm, which means preferably consists of a slidable bar splined to a rotatable sleeve which carries the arm is arranged to carry the shifting apparatus for the pinion.

Referring again to the drawings by use of reference characters, 1 indicates the driving shaft which may be splined within a tubular driving member, 2, which it will be assumed is connected to the driving member of an already existing transmission or directly to the engine. The shaft 1 carries a pinion 3 which may be formed on the enlarged inner end of the shaft or rigidly attached thereto. The driven shaft 4 has its bearing in the end wall of an eccentrically mounted shell or bearing member 5 and carries the internal member 6 of a dental clutch and preferably two internal gears 7 and 8 for different speed reductions between the driven and driving shafts. One of these gears is shown as permanently in mesh with an idler pinion 9 supported by a bracket within the eccentric bearing member.

I have shown the driving shaft 1 mounted in bearings 10 and 11. The former bearing is secured in an inturned tubular projection 12 on the rear wall portion 13 of the main housing 14 and is held in place against longitudinal shifting by end plates 16 and 17. This bearing preferably consists of a series of rollers in order that an adequate length of bearing may be presented to the shaft, which I have shown as shiftable longitudinally relative to the bearing. The other bearing namely 11, may be the simplest form of ball bearing, the inner race of which is shown as secured to the splined sleeve 2 which it will be remembered has no longitudinal shifting movement. The portion of the housing in which the bearing 11 is mounted is preferably an elongated cup-like casing 20 which may be secured to the main housing 14 as by a series of screws, one of which is indicated at 21. The means for shifting the shaft longitudinally of its axis will be later described.

The eccentric member 5 is adapted to turn freely within the housing 14 upon the radial bearing surfaces 25 and 26, which are shown as separated to reduce the turning friction as well as to provide an oil channel 30 which may extend substantially around the bearing. The eccentric is held in place by a flat annular plate 27 which has an inwardly facing groove 28 for retaining a fiber oil ring whereby oil supplied to the bearing surfaces 25 and 26 is prevented from escaping. The forward portion of a tubular projection 31 extending rearwardly from the eccentric 5 carries a roller bearing 32 and another smaller roller bearing 33 for supporting the shaft 4. An attaching flanged member 36 is shown as keyed to the rearward end of the shaft 4 which is adapted to be secured to the universal driving coupling of the usual propeller shaft (not shown).

To effect reverse I have shown an idler gear 9 supported within the eccentric bearing member upon a bracket 38. The bracket may be secured by screws 39 to the inner peripheral wall of the eccentric and is permanently in mesh with one of the gears, for instance the gear 8.

To effect the necessary change of relation between the two shafts to selectively drive the internal gear member forwardly at the desired speed or rearwardly, I employ a geared connection between the operating means and the eccentric gear carrying member whereby I may cut down the angular movement of the operating means. To effect this, I prefer to provide longitudinally projecting pins 40 on the rear wall of the eccentric bearings. Cooperating with these pins, I have shown a circular plate 41 having a series of teeth 42, the plate being secured as by rivets 43 to a tubular rotatable head 44 which preferably has its bearing in a short bracket portion 45 of the casing 14. A suitable locking plate 47 may be secured to this bracket, the down-turned end of which engages a peripheral slot 48 in the head to prevent its removal. The open end of the head may be effectively closed by a flat plate 49 shown as held in place by the rivets 43. Cooperating with the head 44 and adapted to be moved longitudinally therein by reason of the spline 50, I have shown preferably a circular bar 51, one end of which is supported by the elongated cup-like housing 20. This bar also carries a shifting arm 52 which depends within the last mentioned housing to a shifting collar 53 secured to the shaft 1.

It will be seen that a forward or rearward movement of the bar 51 will slide the drive shaft 1 to bring the pinion into the various positions where it may engage the clutch teeth 6, the gears 7 and 8 for direct drive or the reversing idler 9. To accomplish this engagement the shaft 51 is first rocked to position the selected gear through the geared shifter ring and pin connection so that a portion of its teeth are in alignment with the teeth of the pinion. In Fig. 3, I have shown a portion of the eccentric bearing having a series slots of different depths indicated at 55, 56, 57 and 58, and in Figs. 1 and 2, I have shown a projection 52ª depending from the member 52 in position to enter the slot 57. When in this position the pinion is in direct alignment with the dental clutch 6, engagement with which will result in a direct drive. Either of the gears 7 and 8 may be brought into position to engage the pinion by the clockwise movement of the bar 51 necessary to rotate the eccentric a degree sufficient to bring the slots 56 or 55 into alignment with the projection 52ª while the engagement of the pinion with the reverse idler is effected by a counterclockwise rotation of the bar and plate necessary to bring the slot 58 into alignment with the projection.

Referring to Fig. 4, I have shown an arrangement of gears whereby I may effect a reverse drive by causing an external gear to engage the driving pinion. This will obviate the necessity for providing an idler pinion and a supporting bracket therefor.

In this construction clutch teeth, two internal gears of increasing size and an external gear are indicated at 60, 61, 62 and 63 respectively. Fig. 4 shows the pinion in engagement with the reversing gear and the aligning projection 52ª will occupy the slot 63ª. The corresponding slots for the clutch and gears 60, 61 and 62 are indicated at 60ª, 61ª and 62ª. The relative distance between the axes of rotation of the eccentric and the driven shaft is shown as somewhat greater in this construction. The additional swing of the eccentric necessary to move the driven member to reversing position is somewhat compensated by eliminating the swing in the opposite direction from direct drive position present in the other form. It will be noted that the angular movement of the geared member 14ª which through teeth 42ª and projection 40ª effects the desired rotation of the eccentric, is substantially the same as in the other construction. In either form shown, this movement is less than 40 degrees.

It will be seen that I have provided a simple arrangement of change speed gearing which may be easily and quickly assembled into a compact unit capable of accomplishing the various objects outlined in the opening paragraphs.

I claim:—

1. In combination in a transmission mechanism, a driving member, a casing, a bearing within the casing for supporting the driving member, an eccentric bearing member adapted to be rotated within the casing through predetermined angles, a driven member carried by the eccentric bearing, a dental clutch and a plurality of internal gears carried by said driven member, a pinion rigidly carried by said driving member and means including a motion multiplying gear mechanism cooperating with the eccentric bearing and an operating member in splined relation to one of such motion multiplying gears for rotating the bearing to cause the lateral movement of the internal gears and clutch relative to the pinion to bring the teeth of any one of the gears or of the clutch into alignment with the teeth of the pinion and for subsequently shifting the pinion longitudinally into driving engagement therewith.

2. The combination in a transmission mechanism, a driving member a pinion carried thereby, a casing, a bearing within the casing for supporting the driving member, an eccentric bearing member adapted to be rotated within the casing through predetermined angles a gear rigid with the bearing, a driven member carried by the eccentric bearing, a dental clutch, internal gears and an external reverse gear carried by said eccentric bearing member and means including a gear cooperating with the first named gear for causing the lateral movement of the internal gears and clutch relative to the pinion to bring the teeth of any one of the gears or of the clutch into alignment with the teeth of the pinion and for subsequently shifting the pinion longitudinally into driving engagement therewith.

3. In combination, in a transmission mechanism, a driving member, a casing, an elongated roller bearing within the casing for supporting the driving member, an eccentric bearing member adapted to have a rotating movement within the casing, a driven member carried by the eccentric bearing having its axis parallel to that of said driving member, a clutch, a plurality of internal gears, and an external reversing gear carried by said eccentric member, a pinion carried by said driving member, rotating means carried by the casing and cooperating with the eccentric bearing for causing the lateral movement of the gears and clutch relative to the pinion to bring a portion of the teeth of any one of the gears or the clutch into alignment with the teeth of the pinion and for subsequently shifting the pinion longitudinally into driving engagement therewith.

4. In a gearing of the class described in combination a casing, a driving member carried by the casing having a pinion, an eccentric bearing member mounted to rotate within the casing, a driven member carried by the bearing member and having an internal gear, means for causing engagement of the gear with the pinion comprising a bar rotatably mounted in the casing, a gear member secured to the bar and a gear member carried by the eccentric bearing adapted to cooperate with said other gear member to turn the bearing.

5. In a gearing of the class described in combination a casing, a driven member carried by the casing having a pinion, an eccentric bearing member mounted to rotate within the casing, a driven member carried by the bearing member and having a plurality of internal gears and an external reversing gear, means for rotating the eccentric member to cause selective alignment of the gears with the pinion, comprising a bar rotatably mounted in the casing, a gear member splined to the bar and a gear member carried by the eccentric bearing adapted to cooperate with said other gear member to turn the bearing.

6. In a gearing of the class described, in combination a casing, a driving member having a pinion, a driven member having a plurality of internal gears, one of said members being carried by the casing, an eccentric bearing member mounted to rotate within the casing for supporting said other member, means for causing selective engagement of the gears with the pinion comprising a bar slidably and rotatably mounted in the casing, a gear member splined to the bar and longitudinally projecting pins carried by the eccentric bearing adapted to cooperate with the splined gear member whereby the internal gears and the pinion may be brought into driving engagement.

7. In a gearing of the class described in combination, a casing, separated roller bearing members carried by the casing, a longitudinally shiftable and rotatable driving member supported in the bearings, a pinion carried thereby, a shifting bar carried by the casing having a shipper arm secured thereto, a shipper collar carried by the shaft between said bearings and engaged by the arm, an eccentric bearing member carried by the casing, a rotatable driven member having a plurality of internal gears carried by the eccentric bearing member, means including the shiftable bar for rotating the eccentric member to cause the gears to be selectively moved into alignment with the pinion, said means acting previously to the operation of the arm and bar to move the pinion into driving engagement with the gears.

8. In a transmission mechanism in combination, a casing, a driven member and a driving member, one being bodily movable transversely of its axis and the other longitudinally of its axis, a plurality of internal gears on one of the members, an external gear on the other member, a dental clutch rigid with the internal gear member, the gears and clutch being adapted to engage the external gear, bearing means carrying the transversely movable member including an eccentrically mounted shell, a radial bearing within the casing therefor having separated contacting surfaces, and means to rotate the shell through predetermined angles to bring the teeth on the driving and driven members into driving alignment.

9. In combination a cup-shaped casing, a driving member carried by the casing, and adapted to be shifted longitudinally thereof, means carried by the casing for shifting said driving member, a cup-shaped eccentric bearing member mounted to turn within the casing, a driven member adapted to be selectively engaged by the driving member to drive said driven member directly or at a plurality of predetermined reduced speeds or in a reverse direction consequent upon the rotation of the eccentric bearing member and shifting of the driving shaft, and means for lubricating said eccentric member comprising an annular channel formed in the casing and extending substantially around the eccentric member, whereby oil may be carried to lubricate the bearing and whereby the bearing surface of the eccentric engaging the casing may be considerably reduced.

10. In combination a casing, a driving member carried by the casing, an eccentric bearing member carried by the casing, a driven member carried by the eccentric bearing adapted to be selectively engaged by the driving member to drive said driven member directly or at a predetermined reduced speed, means whereby the rotation of the eccentric bearing will bring the driving member into driving alignment with the driven member, said means comprising a bar rotatably mounted in the casing, a gear member splined thereto and disposed exteriorly of and at one end of the casing and a cooperating gear member carried by the eccentric.

11. In a gearing, a gear member movable laterally of its axis, a cooperating gear member movable longitudinally of its axis, a movable mounting for said first named gear member, a rotatable and shiftable member having connections with both said mounting and said second named gear member and means whereby the rotating movement acts on the mounting to cause alignment between the respective gear teeth and subsequent shifting movement acts on the second named gear to cause positive engagement between the gear teeth.

12. In a gearing, a gear member movable laterally of its axis, a cooperating gear member movable longitudinally of its axis, a movable mounting for said first named gear member, an operating member having connections with both said mounting and said second named gear member and means whereby the operating member first acts on the mounting to cause alignment between the respective gear teeth and subsequently acts on the second named gear to cause positive engagement between the gear teeth.

In testimony whereof, I hereunto affix my signature.

CHARLES E. F. AHLM.